United States Patent [19]

Schritt

[11] 4,315,555
[45] Feb. 16, 1982

[54] ELECTRO-HYDRAULIC STEERING SYSTEM

[75] Inventor: Renaldo F. Schritt, Bothell, Wash.

[73] Assignee: Grad-Line, Inc., Woodinville, Wash.

[21] Appl. No.: 86,782

[22] Filed: Oct. 22, 1979

[51] Int. Cl.³ .............................................. B62D 5/04
[52] U.S. Cl. ..................................... 180/140; 180/79.1
[58] Field of Search ................. 180/140, 132, 152, 23, 180/24, 9.46, 79.1

[56] References Cited

U.S. PATENT DOCUMENTS

| | | | |
|---|---|---|---|
| 3,087,564 | 4/1963 | Quayle | 180/140 |
| 4,140,193 | 2/1979 | Miller | 180/9.46 |
| 4,175,638 | 11/1979 | Christensen | 180/140 |

*Primary Examiner*—John A. Pekar
*Attorney, Agent, or Firm*—Dowrey & Cross

[57] ABSTRACT

A servo controlled multi-mode steering system for a wheeled land vehicle. Slave wheels respond to the angular position of a steered master wheel and a steering mode select switch to provide front wheel, coordinated or crab steering.

21 Claims, 6 Drawing Figures

ELECTRO-HYDRAULIC STEERING SYSTEM

BACKGROUND OF THE INVENTION

1. Field of the Invention

This invention relates generally to steering systems for vehicles having steerable front and rear wheels. More particularly, this invention relates to a servo-controlled multi-mode steering system wherein the steered wheels turn in concentric arcs.

2. Description of the Prior Art

In order to exhibit favorable maneuverability in restricted zones, a wheeled land vehicle should have a multi-mode steering system which permits an operator of the vehicle to readily select the desired steering mode. Front wheel steering offers the best vehicle stability at higher speeds, but front wheel steering alone is unsuitable for extremely short radius turns and does not permit sidewise or crabbing movement of the vehicle in which all the wheels turn in the same direction. When a vehicle is turning through an arc having a short radius, all the steered wheels should turn through concentric arcs to reduce wear on the vehicle and on the road surface. Short radius turns are best accomplished by a steering system which turns all the wheels of a vehicle in concentric arcs.

Several known prior art devices have multi-mode steering systems which rely on heavy, complex mechanical steering linkages between a steering device and the steered wheels. U.S. Pat. No. 3,532,178 to Lindbom teaches a servo-controlled steering system which permits all the wheels of a vehicle to be turned in concentric arcs in the coordinated steering mode but which does not provide other steering modes. U.S. Pat. No. 3,856,102 to Queen teaches an electro-hydraulic multimode steering system which does not provide for the turning of the steered wheels in concentric arcs in the front wheel and coordinated steering modes. U.S. Pat. No. 3,572,458 to Tax teaches a servo-controlled multimode steering system wherein cams control the angles through which the steered wheels turn; however, the cams must be replaced in order to change the steering mode.

Many servo-controlled steering systems permit the operator of the vehicle to turn the steering wheel faster than the steered wheel is able to follow, and this lack of road feel makes precise steering impossible even at low speeds.

Thus a need exists for a precisely controllable multimode steering system which is not excessively heavy and complex and which may be readily switched from one steering mode to another.

SUMMARY OF THE INVENTION

The present invention provides a servo-controlled, electrohydraulic multi-mode steering system for use on a wheeled land vehicle. An operator steers a master wheel from which an angular position sensor derives a signal which determines a set point for steering the remaining wheels. A steering mode select switch permits an operator to readily select the desired steering mode by simply pushing a lever or a button. The hydraulic components of the invention require no complex mechanical linkages and may be relatively lightweight to reduce construction and operating costs.

The system uses wheel angle position feedback to accurately position the wheels; and the master wheel servo system includes a road feel device which prevents the operator from steering the vehicle at a rate greater than the response time of the electro-hydraulic systems.

The angular positions of the slave wheels are determined electronically to insure rapid, accurate angular positioning of the slave wheels. The wheels are turned through angles such that the master wheel and the slave wheels which are turned in front wheel or coordinated steering, travel in concentric arcs to reduce wear on the tires, on the hydraulic steering mechanisms, and on the surfaces upon which the vehicle operates.

DESCRIPTION OF THE PREFERRED EMBODIMENT

Figure 1:
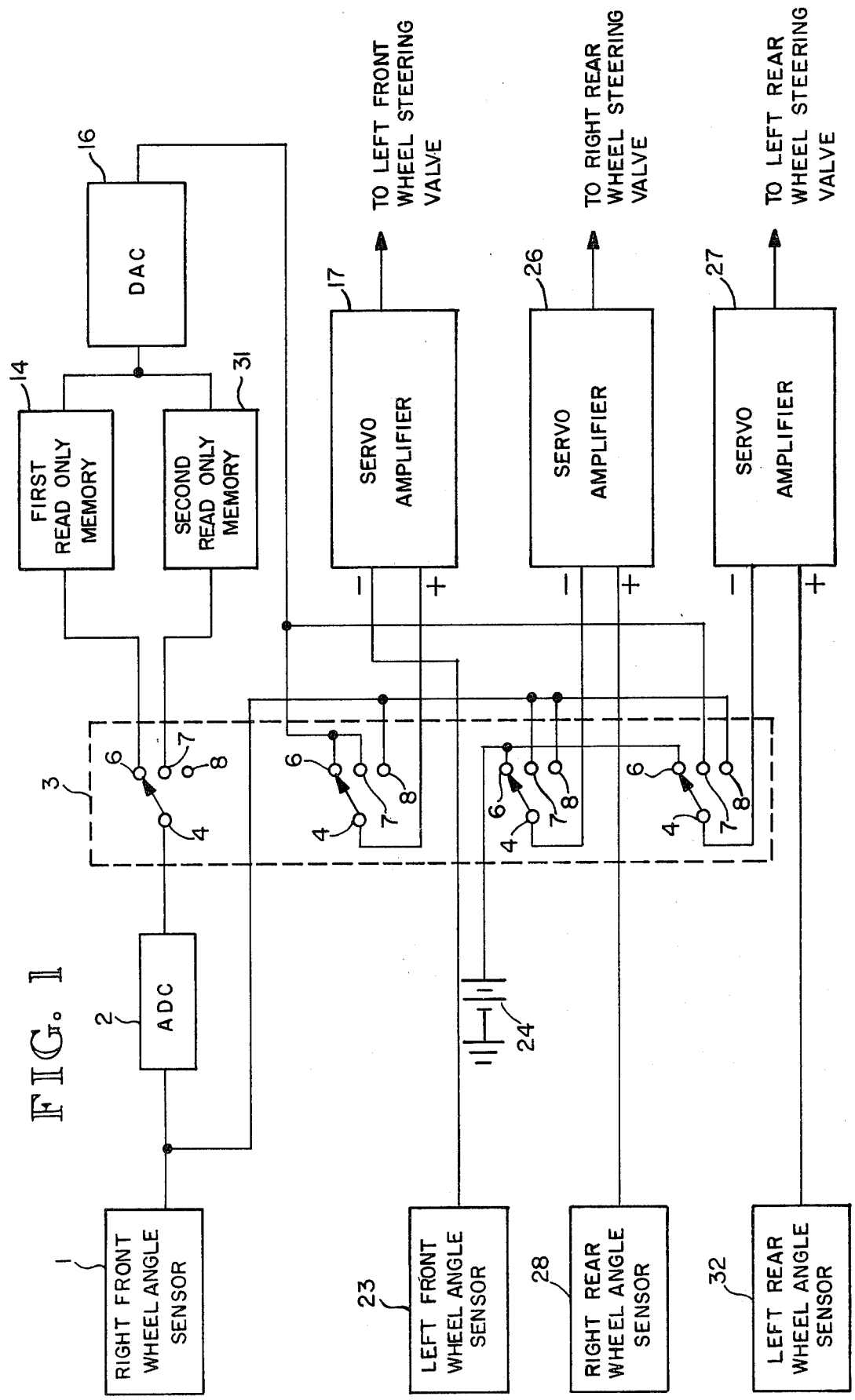
FIG. 1 is a generalized block diagram of the invention.

In the servo-controlled electrohydraulic steering system according to the present invention one wheel of a vehicle, for example the right front wheel, is the master wheel. Referring to FIG. 1, a master wheel angle sensor 1 responds to the angular position of the master wheel by supplying a voltage to an analog to digital converter 2 which converts the master wheel angle sensor signal from analog to digital form. A steering mode select switch 3 has a master wheel mode select terminal 4 connected to the output of the analog to digital converter 2 to selectively connect the master wheel angle signal to a first switch contact 6 corresponding to front wheel steering, to a second switch contact 7 corresponding to coordinated steering or to a third switch contact 8 corresponding to crab steering. The mode select switch 3 contains a mode select terminal 4 for each slave wheel which may be selectively connected to a front wheel steering switch position 6, to a coordinated steering switch position 7 or to a crab steering switch position 8. The mode select terminals 4 are either mechanically linked or responsive to an electronic signal for simultaneous switching between the switch positions 5, 6 and 7 that correspond to the various steering modes.

Figure 2:
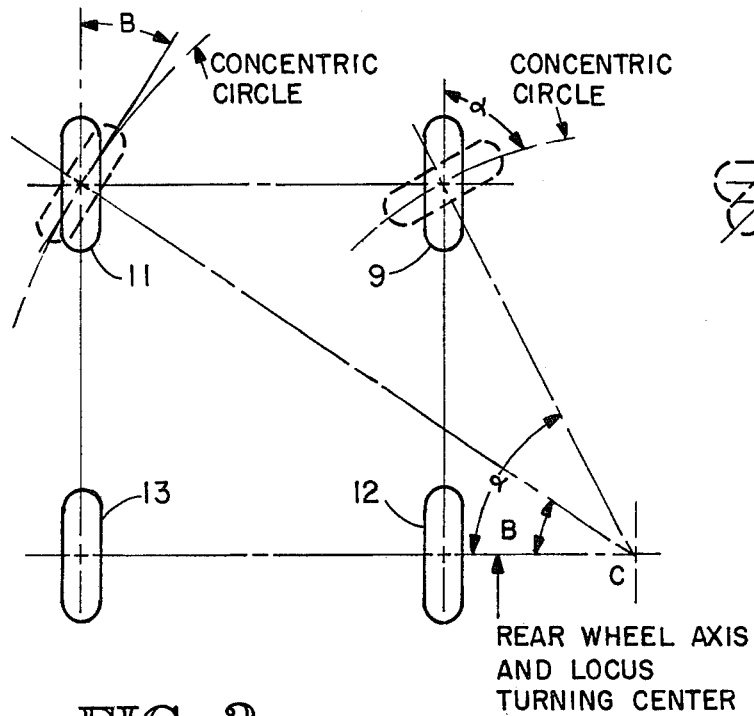
FIG. 2 illustrates steering angles in the front wheel steering mode.

In order to reduce wear on the vehicle tires and on the road surface, all the steered wheels of a large vehicle should turn in concentric arcs, which requires that the steered wheels on the two sides of the vehicle turn through different angles. The typical situation for front wheel steering is illustrated in FIG. 2 wherein $\alpha$ represents the steering angle of the right front, or master, wheel 9 and $\beta$ represents the steering angle of the slave left front wheel 11. If the two front wheels are to turn about a common center C, then the left front wheel must turn through an angle $\beta$ given by $$\beta = \tan^{-1}\left[\frac{1}{\frac{1}{\tan \alpha} + \frac{TW}{WB}}\right]$$

where WB is the wheel base of the vehicle and TW is the track width.

Figure 3:
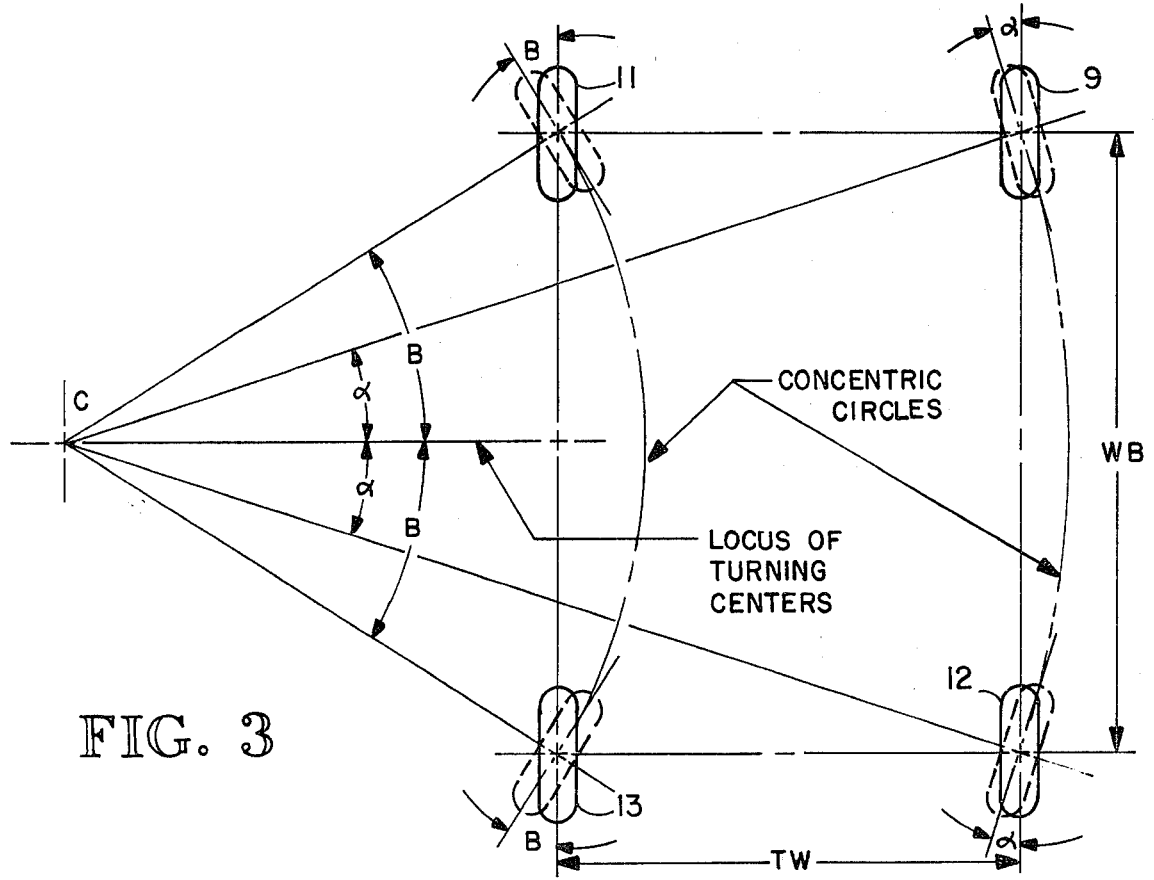
FIG. 3 illustrates the steering angles for coordinated steering.

FIG. 3 shows the steering angles for coordinated steering wherein all four wheels turn about a point which lies along the perpendicular bisector of the wheel base. Coordinated steering requires that if the right front wheel, herein designated the master wheel, turns through an angle $\alpha$ in one direction, then the right rear wheel 12 must turn through an angle $-\alpha$; and the left front wheel 11 must turn through an angle $\beta$ in the same direction as the master wheel 9 while the left rear wheel 13 turns through an angle $-\beta$ in the same direction as the right rear wheel 12. The angles $\alpha$ and $\beta$ are related by the formula $$\beta = \tan^{-1}\left[\frac{1}{\frac{1}{\tan \alpha} + \frac{2TW}{WB}}\right]$$

Figure 4:
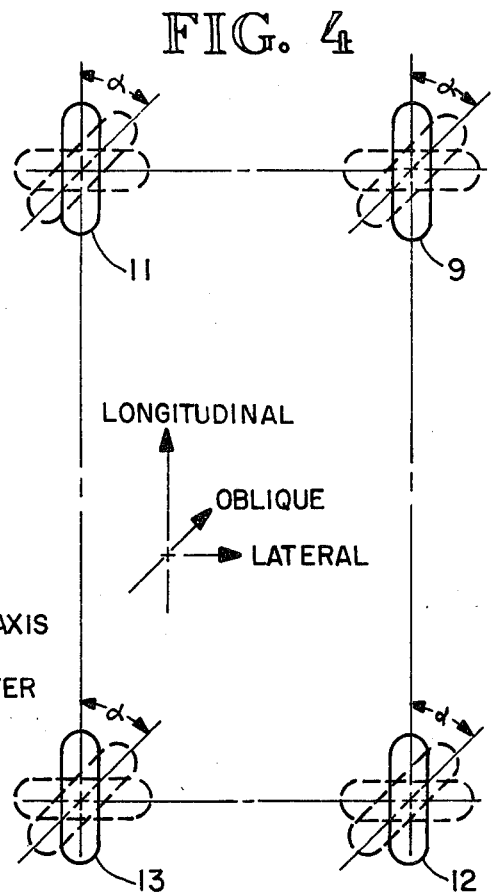
FIG. 4 illustrates the steering angles for crab steering.

As shown in FIG. 4, all the wheels turn through the same angle in the same direction for crab steering.

In the front wheel steering mode the mode select switch 3 connects the output of the analog to digital converter 2 to a first read only memory 14. The read only memory 14 contains a table of angles $\beta$ computed by the formula which determines the wheel angle for the slave left front wheel 11 in the front wheel steering mode. In the front wheel steering mode the output of a digital to analog converter 16 is connected through left front wheel switch contact 6 to the mode select terminal 3 which is connected to the positive input of a servo amplifier 17.

Figure 5:
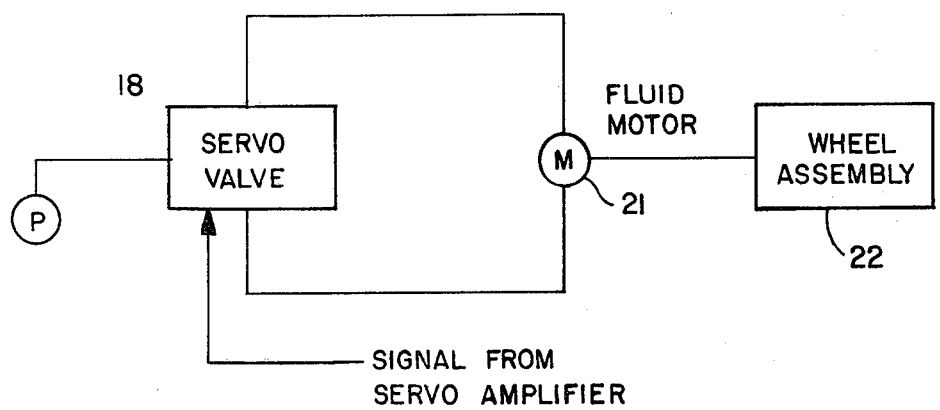
FIG. 5 is a schematic of the hydraulic system for a slave wheel.

FIG. 5 illustrates the hydraulic system for each slave wheel. For the left front wheel a servo valve 18, which controls the flow of hydraulic fluid pressurized by pump 19, receives a control signal from servo amplifier 17 and drives a hydraulic actuator which may be a fluid motor 21 which places the wheel assembly 22 in the proper anglular position.

The output of a left front wheel angle sensor 23 is connected to the negative input of the servo amplifier 17 which produces a control signal proportional to the difference between the signal from left front wheel angle sensor 23 and the signal received from the digital to analog converter 16. The front wheel steer switch contacts 6 for the right rear wheel 12 and the left rear wheel 13 are connected to a reference voltage 24 which may be about four volts; and the reference voltage 24 is connected by the mode select switch 3 to the negative input terminals of a servo amplifier 26 and a servo amplifier 27 corresponding to the right rear wheel 12 and to the left rear wheel 13, respectively. A right rear wheel angle sensor 27 is connected to the positive input terminal of servo amplifier 26 and a left rear wheel angle sensor 29 is connected to the positive input of servo amplifier 27. In the front wheel steering mode servo amplifier 26 compares the reference voltage 24 and the output of the right rear wheel angle sensor 28 to produce a control signal which causes the right rear wheel to point straight ahead; and, similarly, servo amplifier 27 compares the reference voltage 24 to the output of the left rear wheel angle sensor 29 to cause the left rear wheel to point straight ahead. The outputs of servo amplifiers 26 and 27 are each connected to an electrohydraulic system identical to that shown in FIG. 5.

In the coordinated steering mode the mode select terminal 4 is connected to the second switch contact 7 which connects the output of the analog to digital converter 2 to a second read only memory 31 which contains a table of angles $\beta$ which correspond to the proper steering angles for the left front wheel 11 and the left rear wheel 13 when the master wheel turns through an angle $\alpha$ in the coordinated steering mode. The output of the second read only memory 31 is connected to the digital to analog converter 16 whose output is connected to the coordinated steer contacts 7 for the left front wheel and the left rear wheel 13. The mode select switch 2 connects the signal corresponding to a left wheel angle to the positive input of servo amplifier 17 and to the negative input of the servo amplifier 27, thereby causing the servo amplifiers 17 and 27 to have outputs which turn the left front wheel 12 through the angle $\beta$ and the left rear wheel 13 through the angle $-\beta$. The coordinated steering switch position 7 of the right rear wheel receives from the master wheel angle sensor a signal which the mode select switch 2 connects to the negative input of servo amplifier 26 to cause the right rear wheel to turn through an angle $-\alpha$ in a direction opposite to the angle $\alpha$ of the master, or right front, wheel.

The functions of the analog to digital converter 2, steering mode select switch 3 and read only memories 14 and 31 could be accomplished by a properly programmed microprocessor.

In a large vehicle which moves at a speed in excess of two or three miles per hour it become increasingly difficult for an operator to precisely steer the vehicle unless a means is provided to prevent the operator from turning the steering wheel faster than the steered wheel is able to follow. A means for preventing an operator from turning the steering wheel faster than the steered wheel is able to follow is defined to be "road feel".

Figure 6:
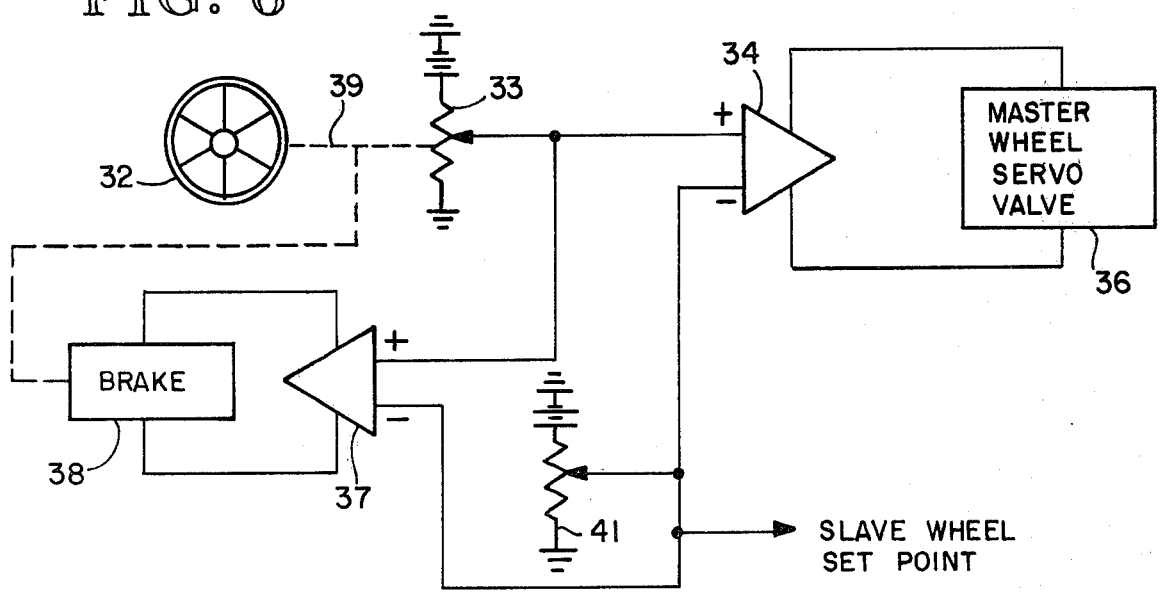
FIG. 6 is a diagram of the master wheel steering system.

Referring to FIG. 6, there is shown a steering system for the master wheel which incorporates road feel. A steering wheel 32 positions the contact of a potentiometer 33 to control the steering voltage input to a master wheel servo amplifier 34 which supplies an actuating signal to a master wheel servo valve 36 to place the master wheel in the desired position. The master wheel servo valve is connected to a master wheel hydraulic system such as that illustrated in FIG. 5 for the slave wheels. The steering voltage applied to master servo amplifier 34 is also supplied to differential amplifier 37 which actuates a brake 38. Brake 38 exerts a braking force on the steering wheel shaft 39 which limits the rate at which steering wheel 32 may be turned, thereby limiting the rate of change of the steering voltage input to the master wheel servo amplifier. The master wheel angle sensor 1, which may be a potentiometer 41, is connected to the master wheel servo amplifier 36 and the differential amplifier 37 so that the braking force applied to the steering wheel 32 progressively increases as the difference between the actual master wheel angle and the desired master wheel angle increases. The output of master wheel angle sensor 1 provides the set point for the slave wheels.

Although the present invention has been described with reference to a particular embodiment thereof, it will be understood by those skilled in the art that numerous modifications may be made without departing from the scope of the invention. Accordingly, all modifications and equivalents which are properly within the scope of the appended claims are included in the present invention.

What is claimed is:

1. A multi-mode steering system for a vehicle having a plurality of steerable wheels with one of said steerable wheels being a master wheel and the other of said steerable wheels being slave wheels responsive to said master wheel, comprising:
   a steering wheel;
   control means, responsive to the angular position of said steering wheel, for producing a steering voltage output indicative of the angular position of said steering wheel;
   master wheel angle indicator means for producing an output signal indicative of the angular position of said master wheel;
   differential amplifier means having first and second inputs, said first input being connected to the output of said master wheel angle indicator means, said second input being connected to said control means for receiving said steering voltage output, the output of said differential amplifier means being proportional to the difference between the output signal of said master wheel angle indicator means and said steering voltage output;
   means responsive to the output of said differential amplifier means for applying a braking force to said steering wheel, said braking force progressively increasing as the difference between the output signal of said master wheel angle indicator means and said steering voltage output increases, whereby said braking force controls the rate of change of said steering voltage output;
   steering mode select means for selecting a steering mode; and
   signal processing means for providing a steering signal to selected slave wheels to turn said selected slave wheels in arcs concentric with the arc of said master wheel.

2. A multi-mode steering system according to claim 1 wherein said steering mode select means comprises a steering mode select switch for selecting front wheel steering, coordinated steering or crab steering.

3. A multi-mode steering system according to claim 2 wherein said signal processing means includes: means for determining the steering angle for steering said selected slave wheels in arcs concentric with said master wheel; and
   servo amplifier means operatively associated with each slave wheel for producing a control signal to position said slave wheels responsive to said steering mode select means and responsive to the output of said master wheel angle indicator means.

4. A multi-mode steering system according to claim 1 wherein said master wheel angle indicator means includes an analog sensor for sensing the angular position of said master wheel and an analog-to-digital converter for converting the output of said analog sensor into a digital signal for input into said differential amplifier means.

5. A multi-mode steering system according to claim 1 wherein said steering mode select means includes means for selecting a steering mode from front wheel steering, coordinated, steering, or crab steering.

6. A multi-mode steering system according to claim 4 or claim 5 wherein said signal processing means include memory means having first and second sets of slave wheel steering angle signals stored therein, said first set of slave wheel steering angle signals corresponding to front wheel steering, said second set of slave wheel steering angles corresponding to coordinated steering.

7. A multi-mode steering system according to claim 6 further including driving means for placing said slave wheels in a position responsive to said signal processing means and a digital-to-analog converter connected between said memory means and said driving means.

8. A multi-mode steering system according to claim 7 further including:
   servo amplifier means for producing a control signal for said slave wheels;
   servo valve means connected to said servo amplifier means; and hydraulic actuator means connected to said servo valve means for turning said selected slave wheels.

9. A multi-mode steering system according to claim 1 further including:
   servo amplifier means for producing a control signal for said slave wheels;
   servo valve means connected to said servo amplifier means; and hydraulic actuator means connected to said servo valve means for turning said selected slave wheels.

10. A multi-mode steering system according to claim 1 including slave wheel angle sensing means for providing slave wheel position signals indicative of the angular positions of said slave wheels; and driving means for driving said slave wheels in response to said steering mode select means and said slave wheel steering angle signals, said driving means including means for comparing said slave wheel position signals and said slave wheel steering signals for each slave wheel such that the output of said driving means for driving each said slave wheel is proportional to the difference between said slave wheel position signal and said slave wheel steering signal corresponding thereto.

11. A multi-mode steering system for a vehicle having a plurality of steerable wheels with one of said steerable wheels being a master wheel responsive to a steering wheel and the other of said steerable wheels being slave wheels responsive to said master wheel, comprising:
    master wheel angle indicator means for producing an output signal indicative of the angular position of said master wheel;
    steering mode select means for selecting a steering mode;
    memory means for storing slave wheel steering angle signals, said slave wheel steering angle signals being selectively addressable by said steering mode elect means and having as an input the master wheel angular position output to provide slave wheel steering angle signals to selected slave wheels for turning said selected slave wheels in arcs concentric with the arc of said master wheel; and
    means for driving said slave wheels in response to said steering mode select means and said slave wheel steering angle signals.

12. A multi-mode steering system according to claim 11 wherein said master wheel angle indicator means includes an analog sensor for sensing the angular position of said master wheel and an analog-to-digital converter for converting the output of said analog sensor into a digital signal for input into said memory means.

13. A multi-mode steering system according to claim 12 wherein said steering mode select means includes means for selecting a steering mode from front wheel steering, coordinated steering, or crab steering.

14. A multi-mode steering system according to claim 12 or claim 13 wherein said memory means has first and second sets of slave wheel steering angle signals stored therein, said first set of slave wheel steering angle signals corresponding to front wheel steering, said second set of slave wheel steering angles corresponding to coordinated steering.

15. A multi-mode steering system according to claim 12 further including a digital-to-analog converter connected between said memory means and said driving means.

16. A multi-mode steering system according to claim 11 or claim 12 wherein said driving means includes;
    servo amplifier means for producing a control signal for said slave wheels;
    servo valve means connected to said servo amplifier means; and
    hydraulic actuator means connected to said servo valve means for turning said selected slave wheels.

17. A multi-mode steering system according to claim 11 including slave wheel angle sensing means for providing slave wheel position signals indicative of the angular positions of said slave wheels to said driving means, said driving means including means for comparing said slave wheel position signals and said slave wheel steering signals for each slave wheel such that the output of said driving means for driving each said slave wheel is proportional to the difference between said slave wheel position signal and said slave wheel steering signal corresponding thereto.

18. A steering system for a vehicle having a steerable wheel, comprising:
    a steering wheel;
    control means, responsive to the angular position of said steering wheel for producing a steering output signal indicative of the angular position of said steering wheel;
    wheel angle indicator means for producing an output signal indicative of the angular position of said steerable wheel;
    differential amplifier means having first and second inputs, said first input being connected to the output of said wheel angle indicator means, said second input being connected to said control means for receiving said steering output signal, the output of said differential amplifier means being proportional to the difference between the output of said wheel angle indicator means and said steering output signal; and
    means responsive to the output of said differential amplifier means for applying a braking force to said steering wheel, said braking force progressively increasing as the difference between the output of said wheel angle indicator means and said steering output signal increases, whereby said braking force controls the rate of change of said steering output signal.

19. A steering system according to claim 18 wherein said control means comprises a potentiometer.

20. A steering system according to claim 19 further including:
    differential amplifier means having first and second inputs, said first input being connected to said control means, said second input being connected to said wheel angle indicator means; and
    brake means, connected to said differential amplifier means, for applying a braking force to control the rate at which said steering wheel may be turned.

21. A steering system according to claim 18 including:
    servo amplifier means connected to said control means and said wheel angle indicator means, for producing an actuating signal; and
    servo valve means responsive to said actuating signal for placing said steerable wheel in a predetermined position.

* * * * *